United States Patent
Aoki

(10) Patent No.: US 12,115,980 B2
(45) Date of Patent: Oct. 15, 2024

(54) COLLISION PROBABILITY CALCULATION DEVICE, COLLISION PROBABILITY CALCULATION SYSTEM AND COLLISION PROBABILITY CALCULATION METHOD

(71) Applicant: ISUZU MOTORS LIMITED, Tokyo (JP)

(72) Inventor: Tsubasa Aoki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 512 days.

(21) Appl. No.: 17/439,956

(22) PCT Filed: Mar. 16, 2020

(86) PCT No.: PCT/JP2020/011472
§ 371 (c)(1),
(2) Date: Sep. 16, 2021

(87) PCT Pub. No.: WO2020/189624
PCT Pub. Date: Sep. 24, 2020

(65) Prior Publication Data
US 2022/0185270 A1    Jun. 16, 2022

(30) Foreign Application Priority Data

Mar. 18, 2019   (JP) .................. 2019-049599

(51) Int. Cl.
*B60W 30/095*   (2012.01)
*B60W 40/04*    (2006.01)
(Continued)

(52) U.S. Cl.
CPC ........ *B60W 30/0956* (2013.01); *B60W 40/04* (2013.01); *B60W 40/105* (2013.01);
(Continued)

(58) Field of Classification Search
CPC ............ B60W 30/0956; B60W 40/04; B60W 40/105; B60W 40/114; B60W 40/12;
(Continued)

(56) References Cited

U.S. PATENT DOCUMENTS 5,471,214 A  * 11/1995  Faibish .................. G01S 13/865
                                                               342/54
10,267,640 B2 * 4/2019  Asai ........................ G06V 20/56
(Continued)

FOREIGN PATENT DOCUMENTS

CN       102997900 A    3/2013
EP         1772840 A    4/2007
(Continued)

OTHER PUBLICATIONS

English translation of specification of JP 2018045426 (Year: 2018).*
(Continued)

*Primary Examiner* — Abby Y Lin
*Assistant Examiner* — Danielle M Jackson
(74) *Attorney, Agent, or Firm* — Shih IP Law Group, PLLC

(57) ABSTRACT

A collision probability calculation device is provided with: a setting unit that sets a two-dimensional area composed of direction components of a first direction and a second direction, and including a first estimated position where a vehicle is estimated to arrive in the future from a reference position; a first variance calculation unit for calculating a first variance value of first position information in the two-dimensional area; a second variance calculation unit for calculating a second variance value of second position information on a second estimated position where an object is estimated to arrive in the future at the time when the vehicle arrives at the first estimated position; and a probability calculation unit for calculating the probability of a (Continued)

collision between the vehicle and the object, using the two-dimensional area, the first position information, the second position information, the first variance value and the second variance value.

11 Claims, 5 Drawing Sheets

(51) Int. Cl.
    *B60W 40/105* (2012.01)
    *B60W 40/114* (2012.01)
    *B60W 40/12* (2012.01)
    *B60W 50/00* (2006.01)
    *B60W 50/14* (2020.01)
    *G01S 13/931* (2020.01)
    *G06V 20/58* (2022.01)

(52) U.S. Cl.
    CPC .......... *B60W 40/114* (2013.01); *B60W 40/12* (2013.01); *B60W 50/0097* (2013.01); *B60W 50/14* (2013.01); *G01S 13/931* (2013.01); *G06V 20/58* (2022.01); *B60W 2050/143* (2013.01); *B60W 2420/403* (2013.01); *B60W 2420/408* (2024.01); *B60W 2520/14* (2013.01); *B60W 2554/4029* (2020.02); *B60W 2554/4041* (2020.02)

(58) Field of Classification Search
    CPC ............. B60W 50/0097; B60W 50/14; B60W 2050/143; B60W 2420/403; B60W 2420/408; B60W 2520/14; B60W 2554/4029; B60W 2554/4041; B60W 2520/10; B60W 2554/4042; B60W 2554/4043; B60W 2556/20; G01S 13/931; G06V 20/58; G08G 1/166

See application file for complete search history.

(56) References Cited

U.S. PATENT DOCUMENTS

| | | | |
|---|---|---|---|
| 2012/0016627 A1* | 1/2012 | Nagura | G08G 1/161 |
| | | | 702/150 |
| 2013/0073194 A1 | 3/2013 | Nakamura et al. | |
| 2013/0223686 A1* | 8/2013 | Shimizu | G08G 1/166 |
| | | | 382/103 |
| 2013/0293395 A1 | 11/2013 | Ohama | |
| 2018/0137760 A1 | 5/2018 | Kobayashi | |
| 2018/0251092 A1 | 9/2018 | Lee | |
| 2018/0261094 A1 | 9/2018 | Nishimura | |
| 2019/0061748 A1* | 2/2019 | Baba | G08G 1/166 |
| 2020/0116495 A1* | 4/2020 | Yasui | G08G 1/164 |

FOREIGN PATENT DOCUMENTS

| | | |
|---|---|---|
| JP | 2010-038706 A | 2/2010 |
| JP | 2018-045426 A | 3/2018 |
| JP | 2018-091785 A | 6/2018 |
| JP | 2018-151816 A | 9/2018 |
| JP | 2012-118741 A | 6/2021 |
| WO | 2016181618 A1 | 11/2016 |

OTHER PUBLICATIONS

International Search Report from International Application No. PCT/JP2020/011472, mailed Jun. 9, 2020.

* cited by examiner

COLLISION PROBABILITY CALCULATION DEVICE, COLLISION PROBABILITY CALCULATION SYSTEM AND COLLISION PROBABILITY CALCULATION METHOD

TECHNICAL FIELD

The present disclosure relates to a collision probability calculation apparatus, a collision probability calculation system and a collision probability calculation method.

BACKGROUND ART

In the related art, a configuration capable of detecting the future arrival position of a moving object in a region in front of a traveling vehicle is known. For example, PTL 1 discloses a configuration that derives a predicted trajectory in which an object marker detected by a detection unit moves in a direction crossing the vehicle travelling direction and collides with the vehicle.

PTL 2 also discloses a configuration for calculating the probability of a collision between a vehicle and a pedestrian on the basis of the variance values of the position and speed of the pedestrian and the speed of the vehicle.

CITATION LIST

Patent Literature

PTL 1
  Japanese Patent Application Laid-Open No. 2018-91785
PTL 2
  Japanese Patent Application Laid-Open No. 2018-45426

SUMMARY OF INVENTION

Technical Problem

However, since vehicles turn right or left in addition to going straight, it is desirable to have a configuration that can calculate the collision probability between a vehicle and an object, taking right or left turns into account. Since the configurations described in PTL 1 and PTL 2 are based on the assumption that the vehicle is going straight, there is room for improvement in the configuration that can calculate the collision probability between the vehicle and the object.

An object of the present disclosure is to provide a collision probability calculation apparatus, a collision probability calculation system and a collision probability calculation method that can correctly calculate the collision probability between the vehicle and the object.

Solution to Problem

A collision probability calculation apparatus according to the present disclosure includes: a setting section configured to set a two-dimensional region configured with direction components of a first direction and a second direction different from the first direction, the two-dimensional region including a first estimation position where a vehicle is estimated to reach in future from a reference position; a first variance calculation section configured to calculate a first variance value of first location information of the two-dimensional region; a second variance calculation section configured to calculate a second variance value of second location information of a second estimation position where an object is estimated to reach in future at a timing when the vehicle reaches the first estimation position; and a probability calculation section configured to calculate a probability of collision between the vehicle and the object by using the two-dimensional region, the first location information, the second location information, the first variance value and the second variance value.

A collision probability calculation system according to the present disclosure, includes: a first detection section configured to detect a parameter related to the reference position of the vehicle; a second detection section configured to detect a parameter related to a position of the object when the vehicle is located at the reference position; and the collision probability calculation apparatus.

A collision probability calculation method according to the present disclosure, includes: setting a two-dimensional region configured with direction components of a first direction and a second direction different from the first direction, the two-dimensional region including a first estimation position where a vehicle is estimated to reach in future from a reference position; calculating a first variance value of first location information of the two-dimensional region; calculating a second variance value of second location information of a second estimation position where an object is estimated to reach in future at a timing when the vehicle reaches the first estimation position; and calculating a probability of collision between the vehicle and the object by using the two-dimensional region, the first location information, the second location information, the first variance value and the second variance value.

Advantageous Effects of Invention

According to the present disclosure, the collision probability between the vehicle and the object can be correctly calculated.

DESCRIPTION OF EMBODIMENTS

Figure 1:
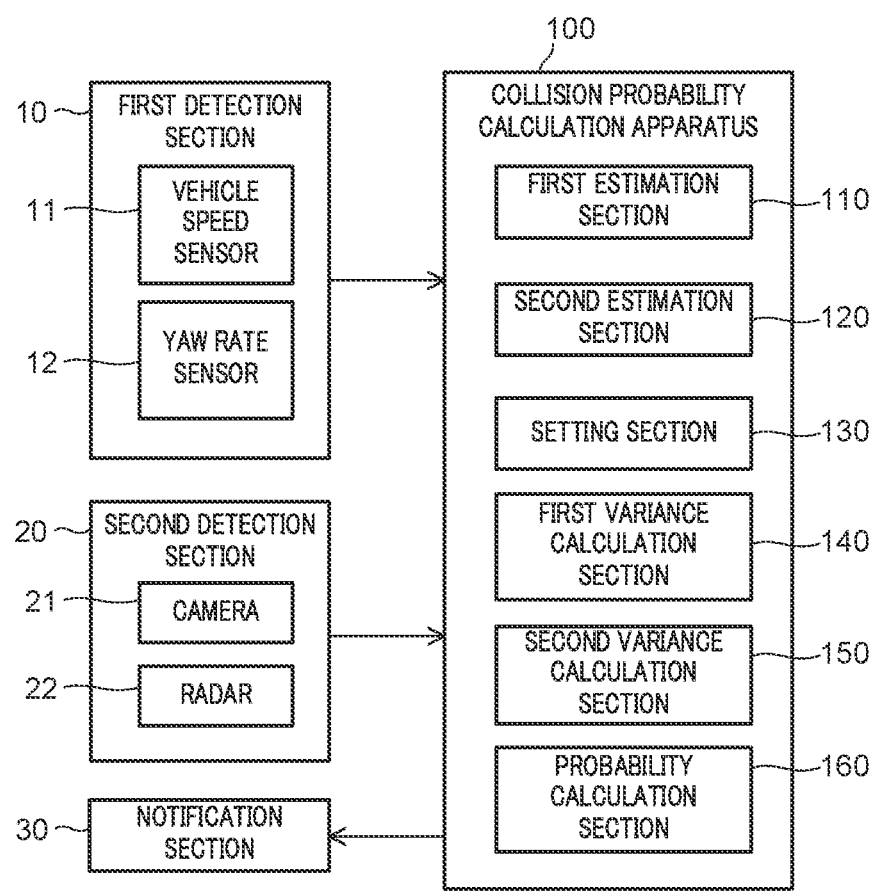
FIG. 1 is a block diagram illustrating a collision probability calculation system according to an embodiment of the present disclosure.

An embodiment of the present disclosure is described below with reference to the drawings. FIG. 1 is a block diagram illustrating collision probability calculation system 1 according to the embodiment of the present disclosure.

As illustrated in FIG. 1, collision probability calculation system 1 is mounted in a vehicle, and calculates the probability of collision between the vehicle and an object (such as a pedestrian). Collision probability calculation system 1 includes first detection section 10, second detection section 20, notification section 30, and collision probability calculation apparatus 100.

First detection section 10 detects a parameter related to the reference position of the vehicle.

The reference position is a given position in the vehicle when first detection section 10 detects the parameter, and a position serving as a reference when setting the two-dimensional region described later. In the present embodiment, in FIG. 2, the reference position is a position of center position Z2 of axle Z1 of vehicle Z, and is set at a position where both an X-component and a Y-component are 0.

Figure 2:
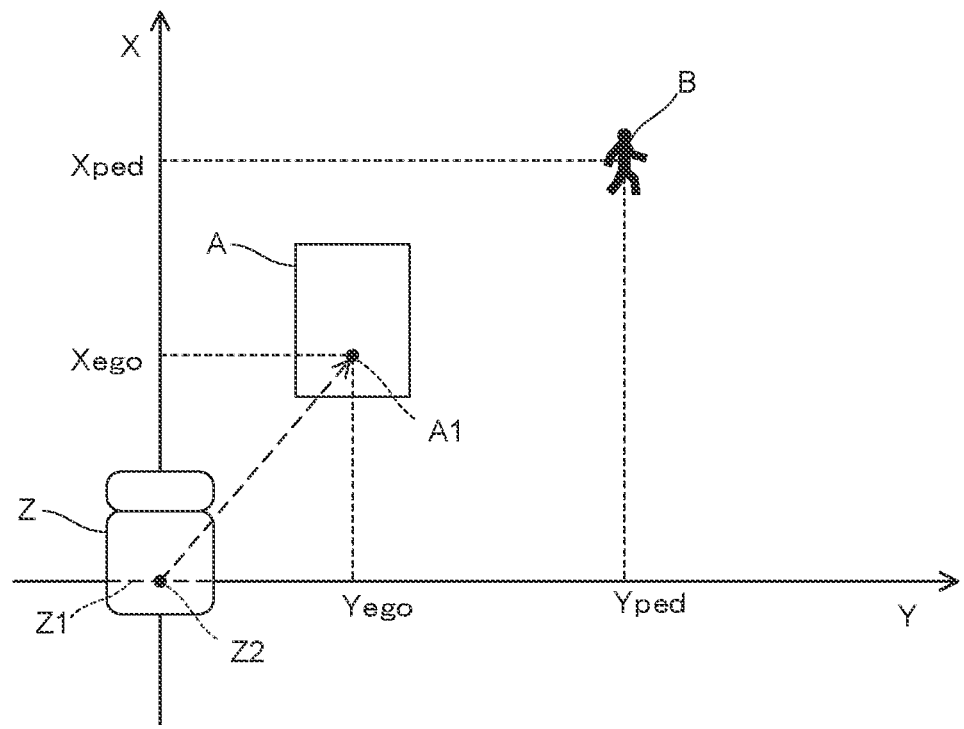
FIG. 2 is a diagram for describing a setting of a two-dimensional region.

The X-component is, for example, a longitudinal direction component in the case where the side of vehicle Z in the longitudinal direction (vertical direction) and the ordinate in FIG. 2 are parallel to each other. The Y-component is a width direction component in the case where the side of the vehicle in the width direction (lateral direction) and the abscissa in FIG. 2 are parallel to each other. The longitudinal direction corresponds to "first direction" of the present disclosure. The width direction corresponds to "second direction" of the present disclosure.

Returning back to FIG. 1, first detection section 10 includes vehicle speed sensor 11 and yaw rate sensor 12. Vehicle speed sensor 11 is a sensor that detects the speed information of the vehicle. Yaw rate sensor 12 is a sensor that detects the yaw rate information of the vehicle.

That is, the above-mentioned parameter related to the reference position includes the speed information of the vehicle and the yaw rate information of the vehicle.

Second detection section 20 detects a parameter related to the position of the object when the vehicle is located at the reference position.

Second detection section 20 includes camera 21 and radar 22, and detects the location information and the speed information of the object when the vehicle is located at the reference position. That is, the above-mentioned parameter related to the position of the object includes the location information and the speed information of the object.

The location information of the object is the above-mentioned X-component and Y-component of the position coordinates of the object in FIG. 2. The speed information of the object is the X-component and the Y-component of the speed of the object in FIG. 2.

Notification section 30 is an alarm apparatus such as a buzzer, for example, and notifies to the driver that the collision probability between the vehicle and the object is high on the basis of a command from collision probability calculation apparatus 100. Note that notification section 30 is not limited to the alarm apparatus, and may be, for example, an automatic brake apparatus that automatically applies the brakes to the vehicle on the basis of the above-mentioned command.

Collision probability calculation apparatus 100 includes a central processing unit (CPU), a read only memory (ROM), a random access memory (RAM) and an input output circuit, which are not illustrated in the drawing. Collision probability calculation apparatus 100 is configured to calculate the collision probability between the vehicle and the object on the basis of a program set in advance.

Collision probability calculation apparatus 100 includes first estimation section 110, second estimation section 120, setting section 130, first variance calculation section 140, second variance calculation section 150, and probability calculation section 160.

First estimation section 110 acquires the speed information and the yaw rate information of the vehicle at the reference position from first detection section 10, and estimates a parameter related to a first estimation position on the basis of the speed information and yaw rate information.

The first estimation position is a position where the vehicle is estimated to reach from the reference position in the future, and is, in the present embodiment, position A1 corresponding center position Z2 of axle Z1 of vehicle Z in FIG. 2. The parameter related to the first estimation position is information including the X-component and the Y-component in the position coordinates of the first estimation position.

From second detection section 20, second estimation section 120 acquires the location information and the speed information of the object when the vehicle is located at the reference position, and estimates the parameter related to a second estimation position on the basis of the location information and speed information.

The second estimation position is a position where the object is estimated to reach in the future at the timing when the vehicle reaches the first estimation position. The parameter related to the second estimation position is information including the X-component and the Y-component in the position coordinates of the second estimation position.

First estimation section 110 and second estimation section 120 estimate the information related to the first estimation position or the information related to the second estimation position through the use of a state space model in which the information acquired from first detection section 10 and second detection section 20 is set as an observation value. First estimation section 110 and second estimation section 120 use a Kalman filter as an estimation algorithm of the information.

The observational equation for the first estimation position is Equation (1), and the state equation for the first estimation position is Equation (2). Note that in Equation (1) and Equation (2), k represents time, and is, in Equation (1), a reference time when the vehicle is located at the reference position. In addition, in Equation (2), for example, each parameter is calculated up to time k+i (i: a natural number that can be arbitrarily set), and the parameters after time k+2 are calculated using the parameter calculated in Equation (2).

(Equation 1)

$$\begin{pmatrix} V_k^{ego} \\ \omega_k^{ego} \end{pmatrix} = \begin{pmatrix} 0 & 0 & 0 & 1 & 0 \\ 0 & 0 & 0 & 0 & 1 \end{pmatrix} \cdot \begin{pmatrix} X_k^{ego} \\ Y_k^{ego} \\ \theta_k^{ego} \\ V_k^{ego} \\ \omega_k^{ego} \end{pmatrix} + E_k \quad [1]$$

Vego: the speed of the vehicle located at the reference position

ω ego: the yaw rate (angular velocity) of the vehicle located at the reference position θ ego: the rotation angle of the vehicle located at the reference position Xego: the X component of the position coordinates of the vehicle (0 when the vehicle is at the reference position)

Yego: the Y-component of the position coordinates of the vehicle (0 when the vehicle is at the reference position)

E: the error at first detection section 10

(Equation 2)

$$\begin{pmatrix} X_{k+1}^{ego} \\ Y_{k+1}^{ego} \\ \theta_{k+1}^{ego} \\ V_{k+1}^{ego} \\ \omega_{k+1}^{ego} \end{pmatrix} = \begin{pmatrix} X_k^{ego} \\ Y_k^{ego} \\ \theta_k^{ego} \\ V_k^{ego} \\ \omega_k^{ego} \end{pmatrix} + \begin{pmatrix} \Delta X_k^{ego} \\ \Delta Y_k^{ego} \\ \Delta t \cdot \omega_k^{ego} \\ 0 \\ 0 \end{pmatrix} + W_k \quad [2]$$

Δ Xego: the X-component of the estimated movement amount calculated based on the rotation angle, speed and yaw rate at time k
Δ Yego: the Y-component of the estimated movement amount calculated from the rotation angle, speed and yaw rate at time k
Δt: the amount of time change from time k to time k+1
W: the noise in Equation (2)

The observational equation for the second estimation position is Equation (3), and the state equation for the second estimation position is Equation (4). In addition, Equation (5) is an equation for converting the relative position coordinate system as the location information calculated by Equation (3) into a coordinate system.

Note that in Equation (3) and Equation (4), k represents time, and is, in Equation (3), the reference time when the vehicle is located at the reference position. In addition, in Equation (4), at time k, each parameter is calculated through substitution of a parameter converted into an absolute coordinate system by Equation (5), for example. In addition, while in Equation (4), each parameter is calculated up to time k+i (i: a natural number that can be arbitrarily set), parameters after time k+2 are calculated using the parameter calculated by Equation (4).

(Equation 3)

$$\begin{pmatrix} X_k^{rel} \\ Y_k^{rel} \\ Vx_k^{rel} \\ Vy_k^{rel} \end{pmatrix} = \begin{pmatrix} X_k^{rel} \\ Y_k^{rel} \\ Vx_k^{rel} \\ Vy_k^{rel} \end{pmatrix} + EE_k \quad [3]$$

Xrel: the X-component of the position coordinates of the object
Yrel: the Y-component of the position coordinates of the object
$V_x$rel: the X-component of the speed of the object
$V_y$rel: the Y-component of the speed of the object
EE: the error at second detection section 20

(Equation 4)

$$\begin{pmatrix} X_{k+1}^{ped} \\ Y_{k+1}^{ped} \\ Vx_{k+1}^{ped} \\ Vy_{k+1}^{ped} \end{pmatrix} = \begin{pmatrix} X_k^{ped} \\ Y_k^{ped} \\ Vx_k^{ped} \\ Vy_k^{ped} \end{pmatrix} + \begin{pmatrix} \Delta t \cdot Vx_k^{ped} \\ \Delta t \cdot Vy_k^{ped} \\ 0 \\ 0 \end{pmatrix} + WW_k \quad [4]$$

Xped: the X-component of the position coordinates of the object after Xrel is converted into an absolute coordinate system
Yped: the Y-component of the position coordinates of the object after Yrel is converted into an absolute coordinate system
$V_x$ped: the X-component of the speed of the object after $V_x$rel is converted into an absolute coordinate system
$V_y$ped: the Y-component of the speed of the object after $V_y$rel is converted into an absolute coordinate system
WW: the noise in Equation (4)

(Equation 5)

$$\begin{pmatrix} X_k^{ped} \\ Y_k^{ped} \\ Vx_k^{ped} \\ Vy_k^{ped} \end{pmatrix} = \begin{pmatrix} X_k^{rel} \\ Y_k^{rel} \\ Vx_k^{rel} + V_k^{ego} \cdot \cos(+\theta_k^{ego}) \\ Vy_k^{rel} + V_k^{ego} \cdot \sin(+\theta_k^{ego}) \end{pmatrix} \quad [5]$$

Through the use of Equations (1) to (5), first estimation section 110 and second estimation section 120 estimate each of i parameters from time k+1 to k+i, which are future times after current time k.

As illustrated in FIG. 2, setting section 130 sets two-dimensional region A on the basis of the parameter related to first estimation position A1 estimated by first estimation section 110. FIG. 2 to FIG. 5 illustrate states where the above-mentioned i is a given number.

The parameter related to first estimation position A1 is the X-component and the Y-component of the position coordinates corresponding to center position Z2 of axle Z1.

Setting section 130 sets two-dimensional region A with reference to the position coordinates corresponding to the center position Z2, and the width and length of vehicle Z.

Two-dimensional region A is set as a rectangular region in which the longitudinal direction of the vehicle is parallel to an ordinate and the width direction thereof is parallel to an abscissa.

Figure 3:
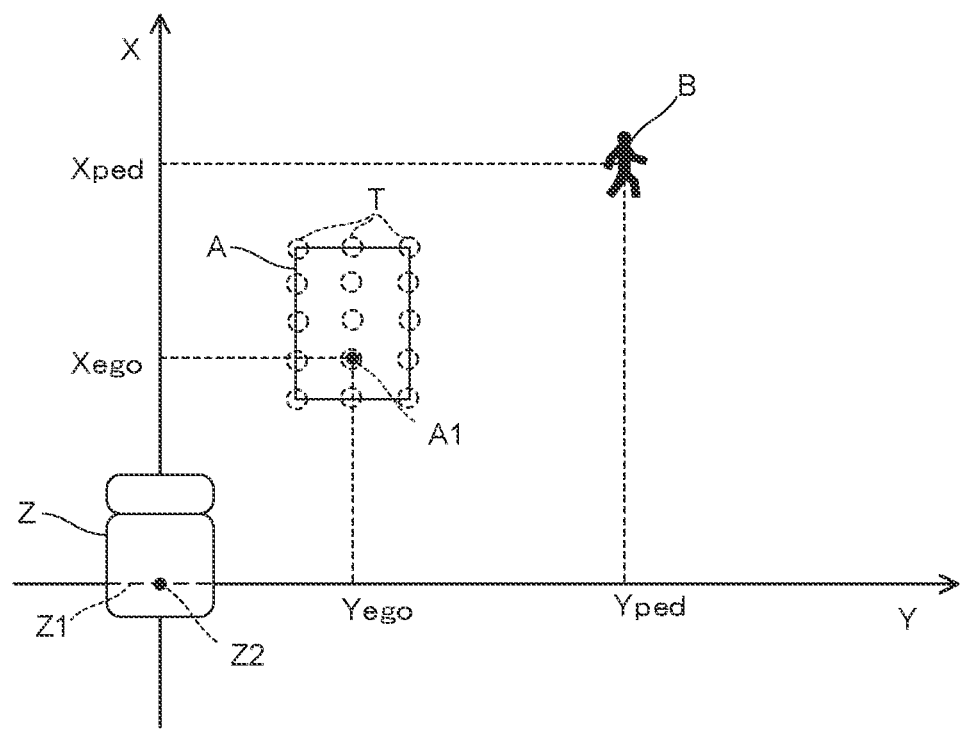
FIG. 3 is a diagram for describing a setting of a representative position.

As illustrated in FIG. 3, setting section 130 sets one or more representative positions T in two-dimensional region A as first location information. FIG. 2 illustrates a total of 15 representative positions, including a position along two-dimensional region A and a position that coincides with center position Z2 of axle Z1.

Figure 4:
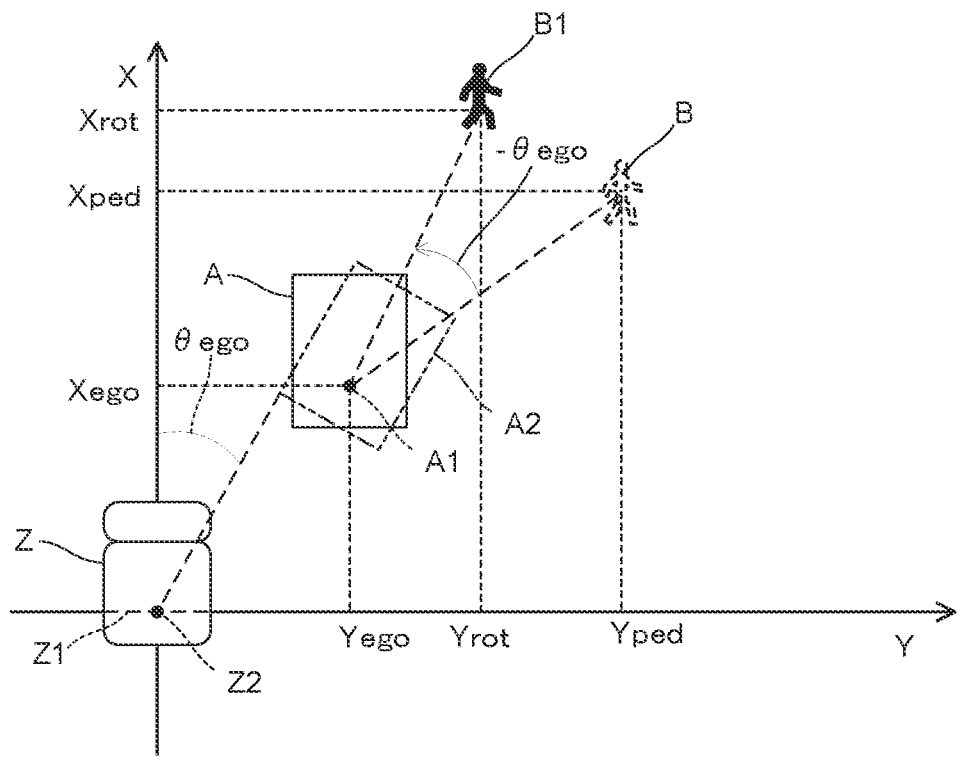
FIG. 4 is a diagram for describing correction of position coordinates of an object.

In addition, as illustrated in FIG. 4, on the basis of the parameter related to the second estimation position of object B estimated by second estimation section 120, setting section 130 corrects the position coordinates of object B such that the position coordinates match two-dimensional region A. Setting section 130 sets second location information as the position coordinates of object B1 after the correction.

Two-dimensional region A is set such that each side is parallel to the ordinate or abscissa, but in the case where vehicle Z turns, vehicle Z is tilted with respect to the ordinate by θ ego estimated by first estimation section 110 as indicated by two-dotted line A2.

Therefore, setting section 130 corrects the position coordinates of object B estimated by Equation (4) such that the position coordinates match two-dimensional region A. Vehicle Z at first estimation position A1 is inherently tilted with respect to two-dimensional region A. Specifically, two-dimensional region A is in a state where it is rotated+θ ego around first estimation position A1 with respect to vehicle Z at first estimation position A1. In view of this, object B is rotated−θ ego around first estimation position A1 such that it matches two-dimensional region A. In this manner, the accuracy of the positional relationship between vehicle Z and object B1 after the correction can be ensured.

First variance calculation section 140 calculates the first variance value of each first location information that is set. To be more specific, first variance calculation section 140 calculates first variance value Pego through the use of the covariance matrix of the Kalman filter as in Equation (6), for example.

(Equation 6)

$$P_{k+i}^{ego} = \begin{pmatrix} \sigma_{k+i}^{ego,X2} & \sigma_{k+i}^{ego,XY} & \ldots \\ \sigma_{k+i}^{ego,XY} & \sigma_{k+i}^{ego,Y2} & \ldots \\ \ldots & \ldots & \ldots \end{pmatrix} \quad [6]$$

Second variance calculation section 150 calculates the second variance value of the second location information that is set. To be more specific, second variance calculation section 150 calculates second variance value Pped through the use of the covariance matrix of the Kalman filter as in Equation (7), for example.

(Equation 7)

$$P_{k+i}^{ped} = \begin{pmatrix} \sigma_{k+i}^{ped,X2} & \sigma_{k+i}^{ped,XY} & \ldots \\ \sigma_{k+i}^{ped,XY} & \sigma_{k+i}^{ped,Y2} & \ldots \\ \ldots & \ldots & \ldots \end{pmatrix} \quad [7]$$

First variance calculation section 140 calculates i first variance values from time k+1 to k+i for a plurality of representative positions T. In addition, second variance calculation section 150 calculates i second variance values from time k+1 to k+i.

Probability calculation section 160 calculates the probability of collision (hereinafter referred to as "collision probability") between the vehicle and the object through the use of two-dimensional region A, the first location information, the second location information, the first variance value and the second variance value. Probability calculation section 160 calculates all collision probabilities of representative positions T in two-dimensional region A.

Specifically, probability calculation section 160 calculates the collision probability on the basis of the two-dimensional regular distribution as in Equations (8) to (12). Note that the parameter in Equation (11) is a value calculated by Equation (6) and Equation (7). In addition, the parameter in Equation (12) is a value calculated by Equation (2), Equation (5) and the like. In addition, Equations (8) to (12) are equations for calculation of the collision probability at time k+i.

(Equation 8)

$$C = \iint_{Area} D_{k+i}(r)dXdY \quad [8]$$

C: the collision probability
Area: within the range of two-dimensional region A
r: the position function (the function of the X-component and the Y-component) within the range of two-dimensional region A
D (r): the probability distribution $$D_{k+i}(r) = \frac{1}{2\pi|\Sigma_{k+i}|^{1/2}} \exp\left(-\frac{1}{2}R_{k+i}^2(r)\right) \quad [9]$$

R (r): the parameter related to the relative position coordinates between the two-dimensional region and the object (Equation 10)

$$R_{k+i}(r) = \left[(r - \Delta r_{k+i})^T \cdot \Sigma_{k+i}^{-1} \cdot (r - \Delta r_{k+i})\right]^{1/2} \quad [10]$$

(Equation 11)

$$\sum_{k+i} \begin{pmatrix} \sigma_{k+i}^{ego,X2} & \sigma_{k+i}^{ego,XY} \\ \sigma_{k+i}^{ego,XY} & \sigma_{k+i}^{ego,Y2} \end{pmatrix} + \begin{pmatrix} \sigma_{k+i}^{ped,X2} & \sigma_{k+i}^{ped,XY} \\ \sigma_{k+i}^{ped,XY} & \sigma_{k+i}^{ped,Y2} \end{pmatrix} \quad [11]$$

(Equation 12)

$$\Delta r_{k+i} = \begin{pmatrix} X_{k+i}^{rot} - X_{k+i}^{ego} \\ Y_{k+i}^{rot} - Y_{k+i}^{ego} \end{pmatrix} \quad [12]$$

Figure 5:
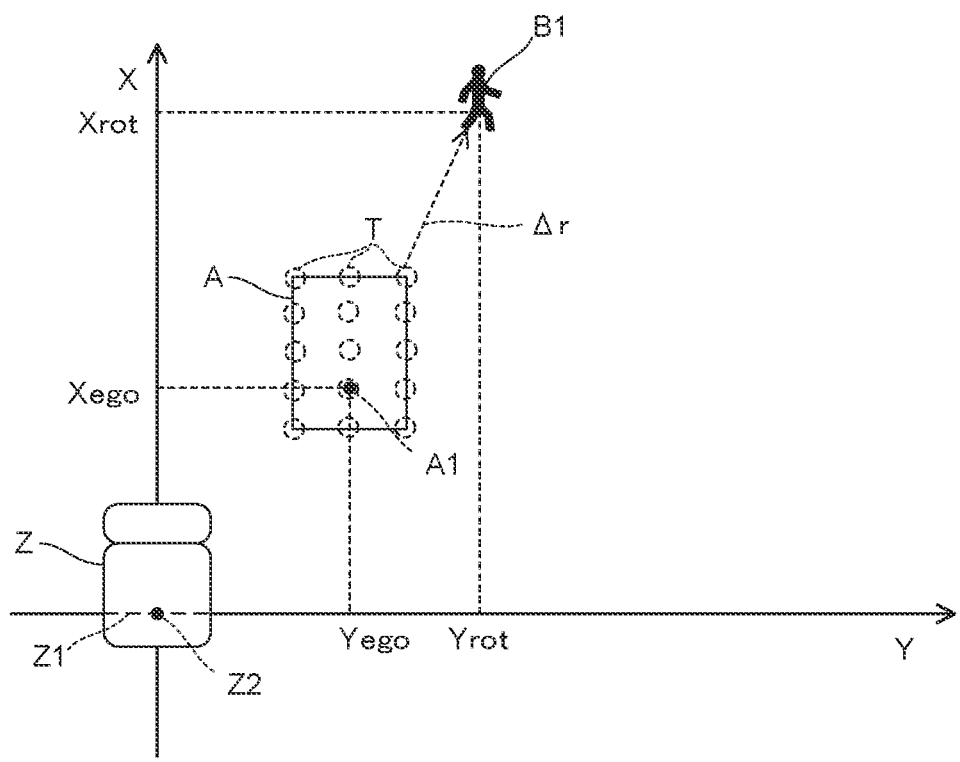
FIG. 5 is a diagram for describing calculation of a collision probability.

Xrot: the X-component of the position coordinates of object B1 after correction of Xped
Yrot: the Y-component of the position coordinates of object B1 after correction of Yped For example, object B1 is determined to be located in two-dimensional region A on the basis of relative position vector Δr between the position of object B1 (the second location information) and given representative position T (the first location information) of two-dimensional region A calculated by Equation (12). Note that FIG. 5 illustrates only the relative position vector Δr between object B1 and representative position T at the upper right end in two-dimensional region A. In addition, for the ease of illustration, FIG. 5 illustrates an example in which object B1 is located outside two-dimensional region A.

In the case where object B1 is located in two-dimensional region A, the possibility of collision between vehicle Z and the object is high. On the other hand, in the case where object B1 is not located in two-dimensional region A on the basis of relative position vector Δr, the possibility of collision between vehicle Z and the object is low.

However, there is a high degree of uncertainty when the collision possibility is determined as described above. Therefore, in the present embodiment, by integrating the probability distribution D(r) expressed by Equation (9) by the X and Y components within the two-dimensional area A in Equation (8), the probability of entry of an object B1 in the two-dimensional area A, i.e., the collision probability, can be calculated.

That is, in the present embodiment, the probability of entry of the object into two-dimensional region A composed of the X-component and the Y-component where vehicle Z is estimated to have reached in the future is calculated, and thus the collision probability can be correctly calculated.

Probability calculation section 160 calculates the collision probability in each two-dimensional region A that moves in a period from a first time to a second time after the time when it is located at the reference position. The first estimation position is estimated for each time, and two-dimensional region A is set for each one. Therefore, probability calculation section 160 calculates the collision probability at all representative positions T in each two-dimensional region A at each time in a period from the first time to the second time.

To be more specific, probability calculation section 160 calculates 15 collision probabilities corresponding to 15 representative positions T at each time. Probability calculation section 160 extracts the first collision probability having the maximum value in all collision probabilities of the calculated representative positions T, for each time.

Figure 6:
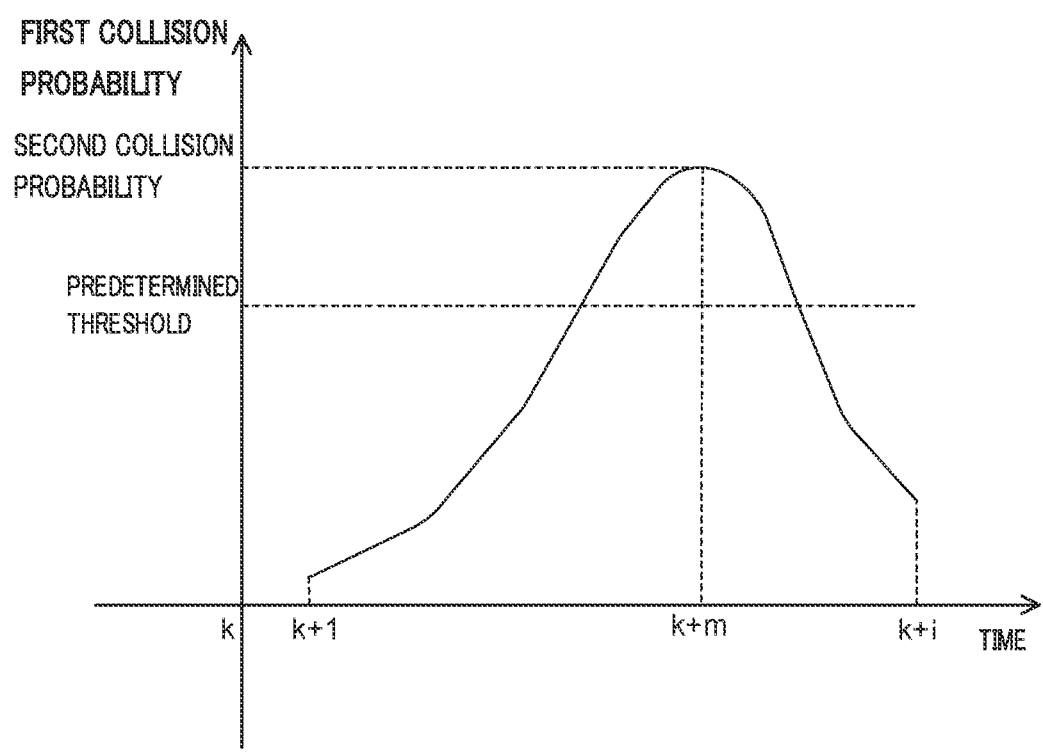
FIG. 6 illustrates a relationship between time and a first collision probability.

The extraction result of the first collision probability is, for example, a graph as illustrated in FIG. 6. The graph illustrates an example in which the first collision probability gradually increases from time k+1 (first time) to time k+m (m: a value smaller than i), and then the first collision probability decreases at time k+i (second time) after the peak time k+m.

Then, probability calculation section 160 determines a second collision probability having the maximum value as the collision probability from among the first collision probabilities in the period from the first time to the second time. In the example illustrated in FIG. 6, probability calculation section 160 determines that the first collision probability at time k+m is the second collision probability.

In this manner, the collision probability having the maximum value in the period in which the collision probability is calculated can be readily extracted.

Probability calculation section 160 outputs an alarm command based on the second collision probability. To be more specific, when the second collision probability has a value equal to or greater than a predetermined threshold, probability calculation section 160 outputs, to notification section 30, an alarm command for notifying the passenger that the collision probability between the vehicle and the object is high.

In this manner, the notification process based on the collision probability having the maximum value in the period in which the collision probability is calculated can be readily performed.

Figure 7:
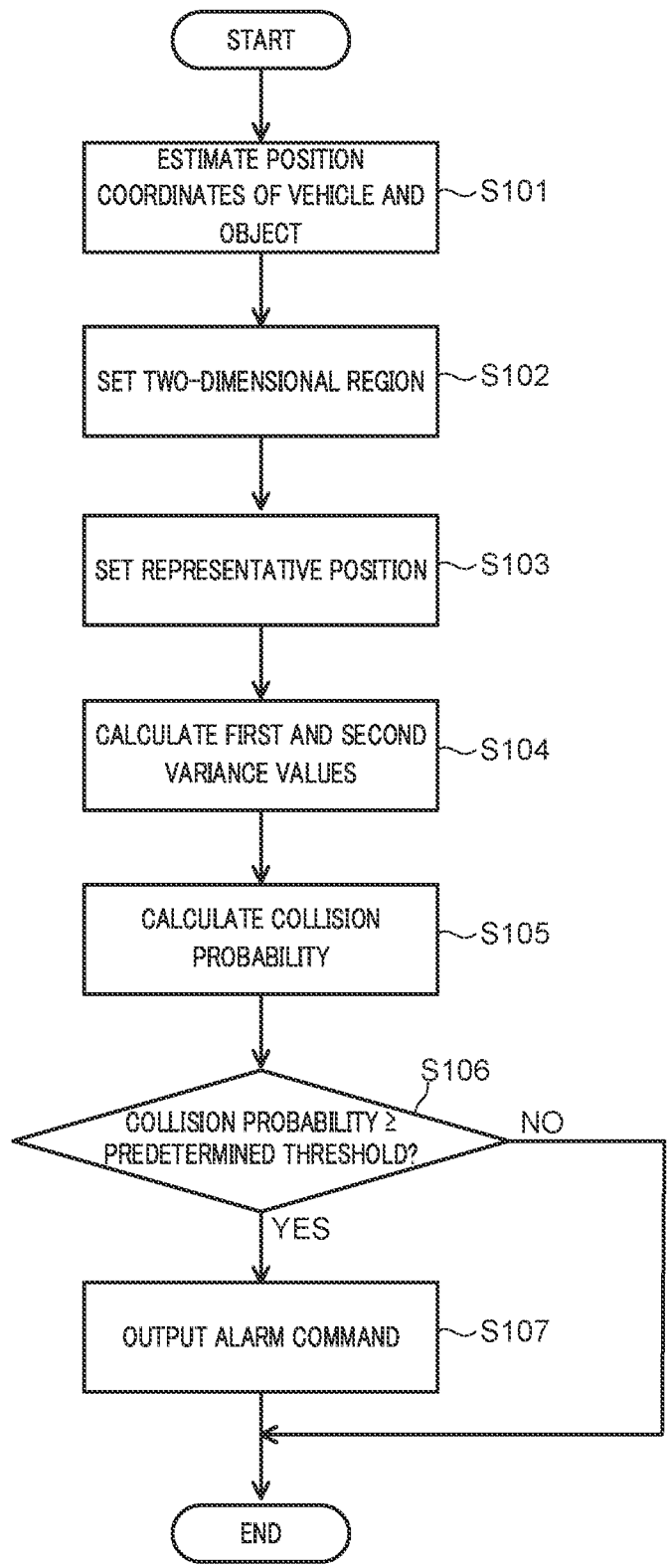
FIG. 7 is a flowchart of an exemplary operation of a collision probability calculation control in a collision probability calculation apparatus.

An exemplary operation of a collision probability calculation control in collision probability calculation apparatus 100 having the above-mentioned configuration is described below. FIG. 7 is a flowchart of an exemplary operation of a collision probability calculation control in collision probability calculation apparatus 100. The process in FIG. 7 is appropriately executed when the vehicle starts driving, for example.

As illustrated in FIG. 7, collision probability calculation apparatus 100 estimates the position coordinates of the vehicle and the object (step S101). Next, collision probability calculation apparatus 100 sets two-dimensional region A on the basis of the estimated vehicle location information (step S102), and sets the representative position (step S103).

Next, collision probability calculation apparatus 100 calculates a first variance value based on each representative position that is set, and a second variance value based on the position coordinates of the object (step S104).

After step S104, collision probability calculation apparatus 100 calculates the collision probability through the use of the first location information, the second location information, the first variance value, and the second variance value (step S105).

Then, collision probability calculation apparatus 100 determines whether the calculated collision probability has a value equal to or greater than the predetermined threshold (step S106). When the collision probability is smaller than the predetermined threshold as a result of the determination (step S106, NO), this control is terminated.

On the other hand, when the collision probability has a value equal to or greater than the predetermined threshold (step S106, YES), collision probability calculation apparatus 100 outputs an alarm command (step S107). After step S107, this control is terminated.

In the present embodiment having the above-mentioned configuration, the collision probability is calculated using two-dimensional region A, the first location information, the second location information, the first variance value and the second variance value, and thus the collision probability in consideration of the positional relationship between the vehicle and the object can be calculated.

To be more specific, the collision probability is calculated by comparing two-dimensional region A to which vehicle Z is estimated to move in the future and the position to which the object is estimated to move in the future, and integrating the function based on the relative position between the vehicle and the object by the X-component and the Y-component. Thus, the collision probability between the vehicle and the object can be correctly calculated.

In addition, the probability of entry of the object into two-dimensional region A composed of the X-component and the Y-component as direction components different from each other is calculated based on the two-dimensional regular distribution, and thus the collision probability in two-dimensional region A can be correctly calculated.

In addition, through the use of two-dimensional region A, the collision probability in consideration of the longitudinal direction and width direction of vehicle can be calculated, and thus, the accuracy of the collision probability can be considerably improved in comparison with a configuration based on information about only the travelling direction of the vehicle, for example.

In addition, since the collision probability based on all representative positions T set in two-dimensional region A is calculated, the collision probability based on a position with high possibility of the collision between the vehicle and the object can be extracted. As a result, the collision probability between the vehicle and the object can be correctly calculated.

In addition, two-dimensional region A is set with reference to the axle of the vehicle. That is, the first estimation position is estimated with reference to the turning center of the vehicle. Thus, when aligning the position of the object to two-dimensional region A, it is only necessary to rotate the position of the object by θ ego estimated by first estimation section 110. As a result, the accuracy of the positional relationship between the vehicle and the object can be easily ensured, and in turn, the collision probability between the vehicle and the object can be correctly calculated.

In addition, since each collision probability at each first position where the vehicle moves from the first time to the second time is calculated, the collision probability having the maximum value among them can be extracted. As a result, increase in collision probability in the future can be determined at an early timing, and the safety can be considerably improved.

Note that while a total of 15 representative positions is aligned in three columns and five rows in two-dimensional region A in the above-described embodiment, the present disclosure is not limited to this as long as at least one representative position is provided in two-dimensional region A. It should be noted that, from the viewpoint of easily extracting the collision probability of a state where object B1 has completely entered two-dimensional region A, it is preferable that setting section 130 provide at least two representative positions T inside dimension region A.

In addition, for example, setting section 130 may set the number of representative positions in the front region of the axle in two-dimensional region A to a number larger than the number of representative positions in the rear region of the axle in two-dimensional region A.

In this manner, the collision probability can be calculated more on the front part of the vehicle, where the possibility of collision with the object is high.

In addition, on the basis of the first location information, setting section 130 may exclude the end portion on the side opposite to the movement direction of the vehicle in two-dimensional region A, from the setting of the representative position. That is, when the vehicle turns right, the left end portion side in two-dimensional region A is excluded from the setting of the representative position.

When a vehicle turns, the inner part of the vehicle on the inner side moves ahead of the outer part on the outside, and therefore the possibility of a collision between the inner part and the object is considered to be high. Therefore, by calculating the collision probability more on the inner part of the two-dimensional area A, it is easier to extract the collision probability based on representative positions with high collision probability.

In addition, while the collision probability is calculated based on Equations (8) to (12) in the present embodiment, the present disclosure is not limited to this, and the collision probability may be calculated based on other methods.

In addition, while each parameter is calculated using a Kalman filter in the present embodiment, the present disclosure is not limited to this, and each parameter may be calculated by other methods.

The above-mentioned embodiments are merely examples of embodiments in implementing the present disclosure, and the technical scope of the present disclosure should not be construed as limited by them. In other words, the present disclosure can be implemented in various forms without deviating from its gist or its main features.

This application is entitled to and claims the benefit of Japanese Patent Application No. 2019-049599 filed on Mar. 18, 2019, the disclosure each of which including the specification, drawings and abstract is incorporated herein by reference in its entirety.

INDUSTRIAL APPLICABILITY

The collision probability calculation apparatus of the present disclosure is useful as a collision probability calculation apparatus, a collision probability calculation system and a collision probability calculation method that can correctly calculate the collision probability between the vehicle and the object.

REFERENCE SIGNS LIST

1 Collision probability calculation system
10 First detection section
11 Vehicle speed sensor
12 Yaw rate sensor
20 Second detection section
21 Camera
22 Radar
30 Notification section
100 Collision probability calculation apparatus
110 First estimation section
120 Second estimation section
130 Setting section
140 First variance calculation section
150 Second variance calculation section
160 Probability calculation section

What is claimed is:

1. A collision probability calculation apparatus, comprising a processor that:
   sets a two-dimensional region configured with direction components of a first direction and a second direction different from the first direction, the two-dimensional region including a first estimation position where a vehicle is estimated to reach in future from a reference position;
   calculates a first variance value of first location information of the two-dimensional region;
   calculates a second variance value of second location information of a second estimation position where an object is estimated to reach in future at a timing when the vehicle reaches the first estimation position; and
   calculates a probability of collision between the vehicle and the object by using the two-dimensional region, the first location information, the second location information, the first variance value and the second variance value,
   wherein the processor sets a plurality of representative positions in the two-dimensional region, as the first location information;
   wherein the processor calculates a variance value for the Plurality of representative positions, as the first variance value;
   wherein the processor calculates the probability at the plurality of representative positions in each two-dimensional region in which the vehicle moves in a period from a first time to a second time after the time when the vehicle is located at the reference position;
   wherein the processor extracts a first collision probability having a maximum value in all probabilities calculated for each time; and
   wherein the processor determines a second collision probability having a maximum value as a collision probability from among the first collision probabilities in the period from the first time to the second time.

2. The collision probability calculation apparatus according to claim 1, wherein the processor calculates the probability on a basis of a two-dimensional regular distribution.

3. The collision probability calculation apparatus according to claim 1,
   wherein the first estimation position is a center position of an axle of the vehicle; and
   wherein the processor sets the two-dimensional region with reference to the center position, a width of the vehicle and a length of the vehicle.

4. The collision probability calculation apparatus according to claim 3, wherein the processor sets a number of a representative positions in a front region of the axle in the two-dimensional region to a number larger than a number of representative positions in a rearward region of the axle in the two-dimensional region.

5. The collision probability calculation apparatus according to claim 1, wherein the processor sets the representative positions at least inside the two-dimensional region.

6. The collision probability calculation apparatus according to claim 1, wherein the processor excludes, from a setting of the representative position, an end portion on a side opposite to a movement direction of the vehicle in the two-dimensional region on a basis of the first location information.

7. The collision probability calculation apparatus according to claim 1, wherein the processor calculates the probability in each two-dimensional region where the vehicle moves from a first time to a second time after a time when the vehicle is located at the reference position; and wherein the processor outputs an alarm command on a basis of a probability having a maximum value among all of the probabilities that are calculated.

8. The collision probability calculation apparatus according to claim 1, wherein the processor estimates a parameter related to the first estimation position on a basis of speed information and yaw rate information of the vehicle at the reference position; and wherein the processor estimates a parameter related to the second estimation position on a basis of location information and speed information of the object when the vehicle is located at the reference position.

9. The collision probability calculation apparatus according to claim 8, wherein the processor sets the second location information by correcting the location information of the object based on the parameter estimated by the second estimation section such that the location information matches the two-dimensional region.

10. A collision probability calculation system, comprising:

a vehicle speed sensor and a yaw rate sensor configured to detect a parameter related to the reference position of the vehicle;

a camera and a radar configured to detect a parameter related to a position of the object when the vehicle is located at the reference position; and the collision probability calculation apparatus according to claim 1.

11. A collision probability calculation method of a collision probability calculation apparatus, comprising:

setting a two-dimensional region configured with direction components of a first direction and a second direction different from the first direction, the two-dimensional region including a first estimation position where a vehicle is estimated to reach in future from a reference position, by the collision probability calculation apparatus;

calculating a first variance value of first location information of the two-dimensional region, by the collision probability calculation apparatus;

calculating a second variance value of second location information of a second estimation position where an object is estimated to reach in future at a timing when the vehicle reaches the first estimation position, by the collision probability calculation apparatus; and calculating a probability of collision between the vehicle and the object by using the two-dimensional region, the first location information, the second location information, the first variance value and the second variance value, by the collision probability calculation apparatus, wherein the setting comprises setting a plurality of representative positions in the two-dimensional region, as the first location information;

wherein the calculating the first variance value comprises calculating a variance value for the plurality of representative positions as the first variance value; and wherein the calculating the probability comprises:

calculating the probability at the plurality of representative positions in each two-dimensional region in which the vehicle moves in a period from a first time to a second time after the time when the vehicle is located at the reference position;

extracting a first collision probability having a maximum value in all probabilities calculated for each time; and determining a second collision probability having a maximum value as a collision probability from among the first collision probabilities in the period from the first time to the second time.

* * * * *